US012313799B2

(12) United States Patent
Feng et al.

(10) Patent No.: US 12,313,799 B2
(45) Date of Patent: May 27, 2025

(54) CALCULATION METHOD FOR ANNUAL AVERAGE PROBABILISTIC SEISMIC LOSS OF EXTERNAL SUBSTRUCTURE REINFORCEMENT SYSTEM BASED ON INTERFACIAL SHEAR STRESSES

(71) Applicant: Southeast University, Nanjing (CN)

(72) Inventors: De-Cheng Feng, Nanjing (CN); Xu-Yang Cao, Nanjing (CN); Gang Wu, Nanjing (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 18/583,948

(22) Filed: Feb. 22, 2024

(65) Prior Publication Data
US 2024/0411036 A1 Dec. 12, 2024

(30) Foreign Application Priority Data

Jun. 9, 2023 (CN) .......................... 202310681490.5

(51) Int. Cl.
*G01N 33/48* (2006.01)
*G01N 33/50* (2006.01)
*G01V 1/28* (2006.01)
*G06N 7/01* (2023.01)

(52) U.S. Cl.
CPC .............. *G01V 1/282* (2013.01); *G06N 7/01* (2023.01)

(58) Field of Classification Search
CPC .......... G01V 1/282; G06N 7/01; G06F 30/20; G06F 30/13; G06F 2111/08; G06F 2119/02; G06F 2119/04; G06F 2119/12; G06F 2119/14
See application file for complete search history.

(56) References Cited

PUBLICATIONS

Cao et al. Dynamic and probabilistic seismic performance assessment of precast prestressed reinforced concrete frames incorporating slab influence through three-dimensional spatial model. Bulletin of Earthquake Engineering, vol. 20, Jul. 1, 2022, pp. 6705-6739. (Year: 2022).*

(Continued)

*Primary Examiner* — Russell S Negin
(74) *Attorney, Agent, or Firm* — Hemisphere Law, PLLC; Zhigang Ma

(57) ABSTRACT

A calculation method for an annual average loss of an external substructure reinforcement system based on interfacial shear stresses is provided. The calculation method includes: step 1: establishing a deterministic model for an external substructure reinforcement system, and generating seismic ground motion samples and structural samples by random sampling; establishing a probabilistic hazard model based on the seismic ground motion samples; generating a probabilistic vulnerability model based on interfacial shear stresses; establishing a total probabilistic loss expectation model by different seismic ground motion intensity levels; and using the total probabilistic loss expectation model to obtain an annual average probabilistic seismic loss of the external substructure reinforcement system based on the interfacial shear stresses. The calculation method can realize classified calculations of the seismic loss of the external substructure reinforcement system. Compared with the traditional seismic loss calculation method, the calculation method is more efficient in calculation.

7 Claims, 6 Drawing Sheets

(56) References Cited

PUBLICATIONS

Hehai University (Applicant), Reply to Notification of First Office Action for CN202310681490.5, w/ (allowed) replacement claims, Apr. 28, 2024.
CNIPA, Notification of Second Office Action for CN202310681490.5, Aug. 1, 2024.
CNIPA, Notification to grant patent right for invention in CN202310681490.5, Dec. 18, 2024.

* cited by examiner

CALCULATION METHOD FOR ANNUAL AVERAGE PROBABILISTIC SEISMIC LOSS OF EXTERNAL SUBSTRUCTURE REINFORCEMENT SYSTEM BASED ON INTERFACIAL SHEAR STRESSES

TECHNICAL FIELD

The present disclosure relates to technical field of anti-seismic reinforcement and loss evaluation of civil engineering structures, and particularly to a calculation method for an annual average probabilistic seismic loss of an external substructure reinforcement system based on interfacial shear stresses.

BACKGROUND

Probabilistic seismic loss analysis belongs to a category of Probabilistic seismic risk analysis. The Probabilistic seismic loss analysis reflects the uncertainty of social and economic losses caused by seism. Based on a given level of structural damage, and the probabilistic seismic loss analysis further reflects a conditional probability that a structure undergoes different degrees of losses or the structure exceeds the given level of structural damage. The probabilistic seismic loss analysis is a foundation for seismic risk decision and safety management, and is also an ultimate goal to apply a probabilistic theory to system decision evaluation.

The external substructure reinforcement refers to a structural system based reinforcement method, which uses the cooperation of an external substructure attached on an original structure to change a structural system of the original structure and transfer damages of the original structure to the external substructure, thereby changing a stress state and a deformation mode of the original structure, enhancing an overall anti-seismic capacity of the original structure, and improving anti-seismic requirements. At present, calculations for loss of external substructure reinforcement are often based on a deterministic calculation method. The calculations for loss of external substructure reinforcement lack a corresponding probabilistic seismic loss calculation method, and existing calculation methods do not consider impacts of destruction, transportation, residual, maintenance and other limit states. In addition, the existing calculations for loss of external substructure reinforcement are often based on an overall drift ratio index of structures, the loss is not evaluated based on interfacial shear stresses between new and old structures, and there is a lack of characteristic evaluation indexes.

SUMMARY

A purpose of the present disclosure is to provide a calculation method for an annual average loss of an external substructure reinforcement system based on interfacial shear stresses, which considers destruction, transportation, residual, maintenance limit states, and uncertainty of seismic loss based on probability and structural performance.

A technical solution provided by the present disclosure includes:
step 1: establishing a deterministic model for the external substructure reinforcement system, and generating seismic ground motion samples and structural samples by random sampling according to the deterministic model;
step 2: establishing a probabilistic hazard model based on the seismic ground motion samples;
step 3: generating a probabilistic vulnerability model based on the interfacial shear stresses;
step 4: establishing a total probabilistic loss expectation model under different seismic ground motion intensity levels according to the probabilistic vulnerability model; and step 5: obtaining the annual average probabilistic seismic loss of the external substructure reinforcement system based on the interfacial shear stresses according to the total probabilistic loss expectation model and the probabilistic hazard model.

In an embodiment, in the step 2, the probabilistic hazard model $H_{IM}(x)$ is expressed as:

$$H_{IM}(x) = P(IM \geq x) = k_0 \cdot x^{-k}$$

$$k = \frac{\ln(p_{DBE}/p_{MCE})}{\ln(IM_{MCE}/IM_{DBE})}$$

$$k_0 = \exp\left[\frac{\ln(IM_{DBE}) \cdot \ln(p_{MCE}) - \ln(IM_{MCE}) \cdot \ln(p_{DBE})}{\ln(IM_{DBE}/IM_{MCE})}\right]$$

where $k_0$ and $k$ represent shape parameters; IM represents a seismic ground motion intensity parameter, $IM_{DBE}$ represents a seismic ground motion intensity parameter of a design basis earthquake (DBE), and $IM_{MCE}$ represents a seismic ground motion intensity parameter of a maximum considered earthquake (MCE); a 50-year exceedance probability of the DBE is 10%, and a return period of the DBE is 475 years, and an annual exceedance probability $p_{DBE}$ of the DBE is 1/475; and a 50-year exceedance probability of the MCE is 2%, and a return period of the MCE is 2475 years, and an annual exceedance probability $p_{MCE}$ of the MCE is 1/2475.

In an embodiment, specifically, the step 3 includes:
step 3.1: determining an amplitude modulation interval m of a seismic ground motion intensity parameter, and setting an interfacial shear stress of the external substructure system as an engineering requirement parameter;
step 3.2: performing nonlinear dynamic time history response analysis according to the amplitude modulation interval m, thereby obtaining seismic ground motion intensity parameters and the interfacial shear stresses under the different seismic ground motion intensity levels;
step 3.3: summarizing the interfacial shear stresses under the different seismic ground motion intensity levels, performing linear regression on the summarized interfacial shear stresses based on a logarithmic coordinate system and a least square method to obtain a regression coefficient $\beta_0$ and a regression coefficient $\beta_1$, and calculating a median value $S_{d|IM}$ and a logarithmic standard deviation $\beta_{d|IM}$ according to the regression coefficient $\beta_0$ and the regression coefficient $\beta_1$ by the following formulas:

$$\ln S_{d|IM} = \beta_0 + \beta_1 \cdot \ln IM$$

$$\beta_{d|IM} = \sqrt{\frac{\sum_{x=1}^{n}(\ln D_x - \ln S_{d|IM})^2}{n-2}}$$

where n represents the number of the seismic ground motion samples under the different seismic ground motion intensity levels, and $D_x$ represents interface shear stress data corresponding to an x-th analysis result of the nonlinear dynamic time history response analysis; and step 3.4: determining limit states and a limitation value d of the external substructure reinforcement system based on the interfacial shear stresses, and generating the probabilistic vulnerability model based on the interfacial shear stresses according to the median value $S_{d|IM}$, the logarithmic standard deviation $\beta_{d|IM}$, and the limitation value d.

In an embodiment, the step 3.2 further includes:

setting an initial seismic ground motion intensity level x=1;

performing a loop: determining a seismic ground motion intensity parameter IM_x corresponding to the seismic ground motion intensity level x, randomly matching a structural sample $n_1$ of the structural samples and a seismic ground motion sample $n_2$ of the seismic ground motion samples under the seismic ground motion intensity level x, and performing the nonlinear dynamic time history response analysis to obtain a required interfacial shear stress τ under the seismic ground motion intensity level x; and when a value of the seismic ground motion intensity level x is less than a value of the amplitude modulation interval m, increasing x by 1 and repeating the loop until the value of the seismic ground motion intensity level x is not less than the value of the amplitude modulation interval m; and performing the step 3.3 when the value of the seismic ground motion intensity level x is not less than the value of the amplitude modulation interval m.

In an embodiment, the probabilistic vulnerability model P(edp|im) is expressed as:

$$P(edp \mid im) = \Phi\left[\frac{\ln(S_{d|IM}/d)}{\beta_{d|IM}}\right] = \Phi\left[\frac{\beta_0 + \beta_1 \cdot \ln IM - \ln d}{\beta_{d|IM}}\right]$$

where $\Phi$ represents a standard normal distribution function.

In an embodiment, the limit states include: a destruction state, a transportation state, a residual state, and a maintenance state.

In an embodiment, after determining the limit states and the limitation value d of the external substructure reinforcement system based on the interfacial shear stresses, the calculation method further includes:

performing a subtraction operation on probabilistic vulnerability models of two adjacent limit states of the limit states, thereby obtaining a probabilistic seismic damage model $P(DS=ds_i|IM)$ expressed as:

$$P(DS = ds_i \mid IM) = P_i(edp \mid im) - P_{i+1}(edp \mid im)$$

where $P_i(edp|im)$ represents a probabilistic vulnerability model corresponding to an i-th limit state of the limit states, and $P_{i+1}(edp|im)$ represents a probabilistic vulnerability model corresponding to an (i+1)-th limit state of the limit states.

In an embodiment, the total probabilistic loss expectation model in the step 4 includes probabilistic loss expectation values corresponding to the limit states; and the probabilistic loss expectation values are composed of a destruction probabilistic loss expectation value $L_C$, a transportation probabilistic loss expectation value $L_T$, a residual probabilistic loss expectation value $L_{NC \cap D}$, and a maintenance probabilistic loss expectation value $L_{NC \cap R}$.

In an embodiment, a calculation formula of the destruction probabilistic loss expectation value $L_C$ under a seismic ground motion intensity parameter IM_x is expressed as:

$$L_C = E[L \mid C] \cdot P(C_P \mid IM) \cdot P(C_T \mid IM) \cdot \alpha 1$$

where E[L|C] represents a theoretical destruction loss expectation value, E[L|C] is equal to a replacement ratio coefficient corresponding to a destruction damage state of the external substructure reinforcement system, $P(C_P|IM)$ represents a probability corresponding to the external substructure reinforcement system being in the destruction damage state under the seismic ground motion intensity parameter IM_x; and $P(C_T|IM)$ represents a probability corresponding to the external substructure reinforcement system being in a transportation damage state under the seismic ground motion intensity parameter IM_x, and α1 represents a destruction loss coefficient;

a calculation formula of the transportation probabilistic loss expectation value $L_T$ is expresses as:

$$L_T = E[L \mid T] \cdot P(C_P \mid IM) \cdot [1 - P(C_T \mid IM)] \cdot \alpha 2$$

where E[L|T] represents a theoretical transportation loss expectation value, E[L|T] is equal to a replacement ratio coefficient corresponding to the transportation damage state of the external substructure reinforcement system, and α2 represents a transportation loss coefficient;

a calculation formula of the residual probabilistic loss expectation value $L_{NC \cap D}$ is expresses as:

$$L_{NC \cap D} = E[L \mid NC \cap D] \cdot P(C_D \mid NC, IM) \cdot \{1 - (C_P \mid IM)\} \cdot \alpha 3$$

where E[L|NC∩D] represents a theoretical residual loss expectation value, and E[L|NC∩D] is equal to a replacement ratio coefficient corresponding to a residual damage state of the external substructure reinforcement system; $P(C_D|NC, IM)$ represents a probability corresponding to the external substructure reinforcement system being in the residual damage state under the seismic ground motion intensity parameter IM_x, and α3 represents a residual loss coefficient;

a calculation formula of the maintenance probabilistic loss expectation value $L_{NC \cap R}$ is expresses as:

$$L_{NC \cap R} = E[L \mid NC \cap R, IM] \cdot \{1 - P(C_D \mid NC, IM)\} \cdot \{1 - (C_P \mid IM)\} \cdot \alpha 4$$

where E[L|NC∩R,IM] represents a theoretical maintenance loss expectation value, and E[L|NC∩R,IM] is equal to a replacement ratio coefficient corresponding to a maintenance damage state of the external substructure reinforcement system; and α4 represents a maintenance loss coefficient.

In an embodiment, a calculation formula of the annual average probabilistic seismic loss of the external substructure reinforcement system based on the interfacial shear stresses according to the total probabilistic loss expectation model and the probabilistic hazard model is expressed as:

$$E[L] = \int_0^\infty E[L|IM] \cdot |dH_{IM}(x)|$$

where E[L] represents the annual average probabilistic seismic loss, E[L|IM] represents a total probabilistic loss expectation value, and and $H_{IM}(x)$ represents the probabilistic hazard model.

In an embodiment, the calculation method further includes: sending the annual average probabilistic seismic loss to management personnel, thereby making, by the management personnel, a seismic risk decision for a target structure corresponding to the external substructure reinforcement system and performing safety management on the target structure according to the average probabilistic seismic loss.

In an embodiment, the calculation method is implemented by a calculation device including a processor and a memory with a calculation application stored therein. The calculation application, when executed by the processor, is configured to implement the calculation method and is further configured to send, over the Internet, the annual average probabilistic seismic loss to a mobile terminal of management personnel. An application installed in the mobile terminal is configured to receive the annual average probabilistic seismic loss, and display the annual average probabilistic seismic loss on the mobile terminal to assist the society management personnel to make a seismic risk decision for a target structure corresponding to the external substructure reinforcement system and perform safety management on the target structure according to the average probabilistic seismic loss.

Beneficial effects of the presents disclosure: compared with the prior art, the present disclosure have the following advantages: 1. By considering influences of the destruction state, the transportation state, the residual state, the maintenance state, as well as the transmission process from the probabilistic hazard, the probabilistic vulnerability to the probabilistic risk of the external substructure reinforcement system, classified calculations of seismic loss are realized, more elaborate proportion data can be provided for different types of seismic loss, and compared with the traditional seismic loss calculation method, the calculation method provided by the present disclosure is more efficient in calculation. The present disclosure provides a basis and reference for the loss evaluation and application of the integral substructure reinforcement technology in seismic-prone areas. 2. Compared with the traditional loss evaluation method based on a drift ratio of structures, the calculation method of the present disclosure performs loss evaluation based on the interfacial shear stresses of the new-old structures, which is more characteristic and applicable. 3. The calculation method of the present disclosure is a probabilistic and performance-based seismic loss uncertainty calculation method. Compared a traditional deterministic loss evaluation method, the calculation method of the present disclosure fully considers the randomness and practicability of an actual project.

DETAILED DESCRIPTION OF EMBODIMENTS

The following is a further explanation of the technical solution of the present disclosure in conjunction with the drawings.

Figure 1:
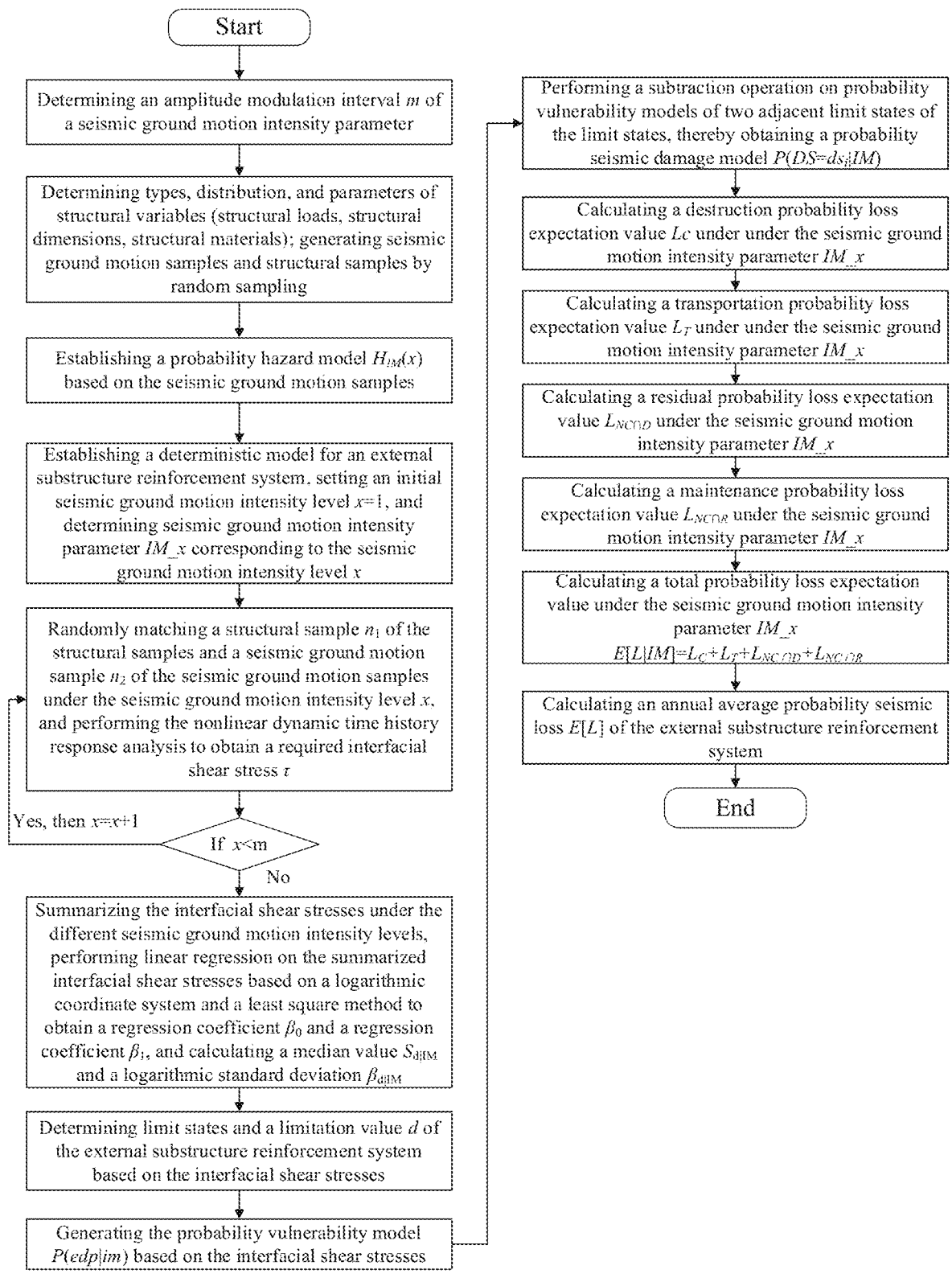
FIG. 1 illustrates a flow chart of a calculation method for an annual average loss of an external substructure reinforcement system based on interfacial shear stresses.

As shown in FIG. 1, a calculation method for an annual average loss of an external substructure reinforcement system based on interfacial shear stresses is provided.

The calculation method includes:
step 1: establishing a deterministic model for the external substructure reinforcement system, and generating seismic ground motion samples and structural samples by random sampling according to the deterministic model;
step 2: establishing a probabilistic hazard model based on the seismic ground motion samples; the probabilistic hazard model $H_{IM}(x)$ is expressed as:

$$H_{IM}(x) = P(IM \geq x) = k_0 \cdot x^{-k}$$

$$k = \frac{\ln(p_{DBE}/p_{MCE})}{\ln(IM_{MCE}/IM_{DBE})}$$

-continued $$k_0 = \exp\left[\frac{\ln(IM_{DBE}) \cdot \ln(p_{MCE}) - \ln(IM_{MCE}) \cdot \ln(p_{DBE})}{\ln(IM_{DBE}/IM_{MCE})}\right]$$

where $k_0$ and $k$ represent shape parameters; IM represents a seismic ground motion intensity parameter, $IM_{DBE}$ represents a seismic ground motion intensity parameter of a design basis earthquake (DBE), and $IM_{MCE}$ represents a seismic ground motion intensity parameter of a maximum considered earthquake (MCE); a 50-year exceedance probability of the DBE is 10%, and a return period of the DBE is 475 years, and an annual exceedance probability $p_{DBE}$ of the DBE is 1/475; and a 50-year exceedance probability of the MCE is 2%, and a return period of the MCE is 2475 years, and an annual exceedance probability $p_{MCE}$ of the MCE is 1/2475;

step 3: generating a probabilistic vulnerability model based on interfacial shear stresses; the step 3 further includes:

step 3.1: determining an amplitude modulation interval m of a seismic ground motion intensity parameter, and setting an interfacial shear stress of the external substructure reinforcement system as an engineering requirement parameter;

step 3.2: performing nonlinear dynamic time history response analysis according to the amplitude modulation interval m, thereby obtaining seismic ground motion intensity parameters and the interfacial shear stresses under the different seismic ground motion intensity levels; the step 3.2 further includes: setting an initial seismic ground motion intensity level x=1;

performing a loop: determining a seismic ground motion intensity parameter IM_x corresponding to the seismic ground motion intensity level x, randomly matching a structural sample $n_1$ of the structural samples and a seismic ground motion sample $n_2$ of the seismic ground motion samples under the seismic ground motion intensity level x, and performing the nonlinear dynamic time history response analysis to obtain a required interfacial shear stress τ under the seismic ground motion intensity level x; and when a value of the seismic ground motion intensity level x is less than a value of the amplitude modulation interval m, increasing x by 1 and repeating the loop until the value of the seismic ground motion intensity level x is not less than the value of the amplitude modulation interval m; and performing the step 3.3 when the value of the seismic ground motion intensity level x is not less than the value of the amplitude modulation interval m;

step 3.3: summarizing the interfacial shear stresses under the different seismic ground motion intensity levels, performing linear regression on the summarized interfacial shear stresses based on a logarithmic coordinate system and a least square method to obtain a regression coefficient $\beta_0$ and a regression coefficient $\beta_1$, and calculating a median value $S_{d|IM}$ and a logarithmic standard deviation $\beta_{d|IM}$ according to the regression coefficient $\beta_0$ and the regression coefficient $\beta_1$ by the following formulas:

$$\ln S_{d|IM} = \beta_0 + \beta_1 \cdot \ln IM$$

-continued $$\beta_{d|IM} = \sqrt{\frac{\sum_{x=1}^{n}(\ln D_x - \ln S_{d|IM})^2}{n-2}}$$

where n represents the number of the seismic ground motion samples under the different seismic ground motion intensity levels, and $D_x$ represents interface shear stress data obtained from an x-th analysis result of the nonlinear dynamic time history response analysis;

step 3.4: determining limit states and a limitation value d of the external substructure reinforcement system based on the interfacial shear stresses; and step 3.5: generating the probabilistic vulnerability model P(edp|im) based on the interfacial shear stresses according to the median value $S_{d|IM}$, the logarithmic standard deviation $\beta_{d|IM}$, and the limitation value d; the probabilistic vulnerability model P(edp|im) is expressed as:

$$P(edp \mid im) = \Phi\left[\frac{\ln(S_{d|IM}/d)}{\beta_{d|IM}}\right] = \Phi\left[\frac{\beta_0 + \beta_1 \cdot \ln IM - \ln d}{\beta_{d|IM}}\right]$$

where Φ represents a standard normal distribution function;

step 4: after determining the limit states and the limitation value d of the external substructure reinforcement system based on the interfacial shear stresses, performing a subtraction operation on probabilistic vulnerability models of two adjacent limit states of the limit states, thereby obtaining a probabilistic seismic damage model $P(DS=ds_i|IM)$ expressed as:

$$P(DS = ds_i \mid IM) = P_i(edp \mid im) - P_{i+1}(edp \mid im)$$

where $P_i$(edp|im) represents probabilistic vulnerability model corresponding to an i-th limit state (in the embodiment, the first limit state is the destruction state, the second limit state is the transportation state, the third limit state is the residual state, and the fourth limit state is the maintenance state) of the limit states, and $P_{i+1}$(edp|im) represents a probabilistic vulnerability model corresponding to an (i+1)-th limit state of the limit states;

step 5: establishing a total probabilistic loss expectation model under different seismic ground motion intensity levels according to the probabilistic vulnerability model; the total probabilistic loss expectation model includes probabilistic loss expectation values corresponding to the limit states; and the probabilistic loss expectation values are composed of a destruction probabilistic loss expectation value $L_C$, a transportation probabilistic loss expectation value $L_T$, a residual probabilistic loss expectation value $I_{NC \cap D}$, and a maintenance probabilistic loss expectation value $I_{NC \cap R}$, that is, $E[L|IM] = L_C + L_T + L_{NC \cap D} + L_{NC \cap R}$;

a calculation formula of the destruction probabilistic loss expectation value $L_C$ under a seismic ground motion intensity parameter IM_x is expressed as:

$$L_C = E[L \mid C] \cdot P(C_P \mid IM) \cdot P(C_T \mid IM) \cdot \alpha 1$$

where E[L|C] represents a theoretical destruction loss expectation value, E[L|C] is equal to a replacement ratio coefficient corresponding to a destruction damage state (the destruction damage state is a probabilistic seismic damage model P(DS=$ds_i$|IM) corresponding to the destruction state) of the external substructure reinforcement system, P($C_P$|IM) represents a probability corresponding to the external substructure reinforcement system being in the destruction damage state under the seismic ground motion intensity parameter IM_x; and P($C_T$|IM) represents a probability corresponding to the external substructure reinforcement system being in a transportation damage state (the transportation damage state is a probabilistic seismic damage model P(DS=$ds_i$|IM) corresponding to the transportation state) under the seismic ground motion intensity parameter IM_x, and α1 represents a destruction loss coefficient;

a calculation formula of the transportation probabilistic loss expectation value $L_T$ is expresses as:

$$L_T = E[L \mid T] \cdot P(C_P \mid IM) \cdot [1 - P(C_T \mid IM)] \cdot \alpha 2$$

where E[L|T] represents a theoretical transportation loss expectation value, E[L|T] is equal to a replacement ratio coefficient corresponding to the transportation damage state of the external substructure reinforcement system, and α2 represents a transportation loss coefficient;

a calculation formula of the residual probabilistic loss expectation value $L_{NC \cap D}$ is expresses as:

$$L_{NC \cap D} = E[L \mid NC \cap D] \cdot P(C_D \mid NC, IM) \cdot \{1 - P(C_P \mid IM)\} \cdot \alpha 3$$

where E[L|NC∩D] represents a theoretical residual loss expectation value, and E[L|NC∩D] is equal to a replacement ratio coefficient corresponding to a residual damage state (the residual damage state is a probabilistic seismic damage model P(DS=$ds_i$|IM) corresponding to the residual state) of the external substructure reinforcement system; P($C_D$|NC, IM) represents a probability corresponding to the external substructure reinforcement system being in the residual damage state under the seismic ground motion intensity parameter IM_x, and α3 represents a residual loss coefficient;

a calculation formula of the maintenance probabilistic loss expectation value $L_{NC \cap R}$ is expresses as:

$$L_{NC \cap R} = E[L \mid NC \cap R, IM] \cdot \{1 - P(C_D \mid NC, IM)\} \cdot \{1 - P(C_P \mid IM)\} \cdot \alpha 4$$

where E[L|NC∩R, IM] represents a theoretical maintenance loss expectation value, and E[L|NC∩R, IM] is equal to a replacement ratio coefficient corresponding to a maintenance damage state (the maintenance damage state is a probabilistic seismic damage model P(DS=$ds_i$|IM) corresponding to the maintenance state) of the external substructure reinforcement system under the seismic ground motion intensity parameter IM_x; and α4 represents a maintenance loss coefficient; and step 6: a calculation formula of the annual average probabilistic seismic loss of the external substructure reinforcement system based on the interfacial shear stresses is expressed as:

$$E[L] = \int_0^\infty E[L \mid IM] \cdot |dH_{IM}(x)|$$

where E[L] represents the annual average probabilistic seismic loss, E[L|IM] represents a total probabilistic loss expectation value, and $H_{IM}(x)$ represents the probabilistic hazard model.

Figure 2:
FIG. 2 illustrates a schematic diagram of an external substructure reinforcement system in an embodiment of the present disclosure.
Figure 3:
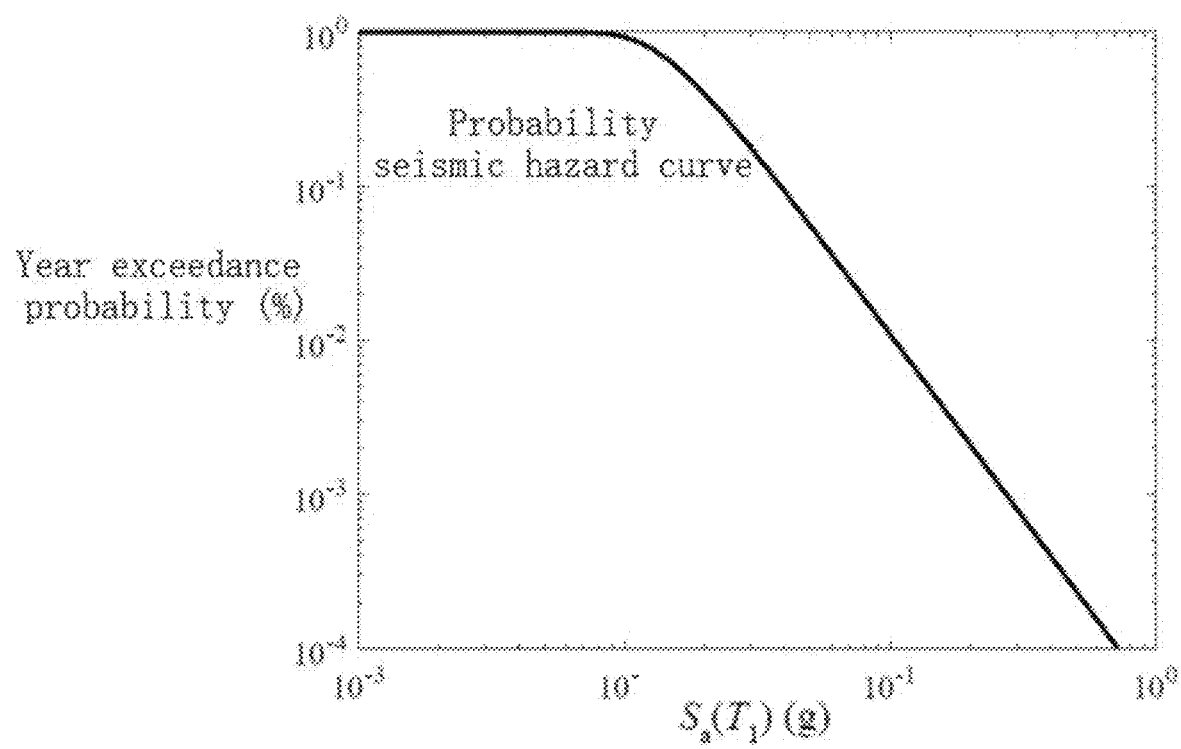
FIG. 3 illustrates a probabilistic seismic hazard curve diagram of the external substructure reinforcement system obtained by the calculation method of the present disclosure.
Figure 4:
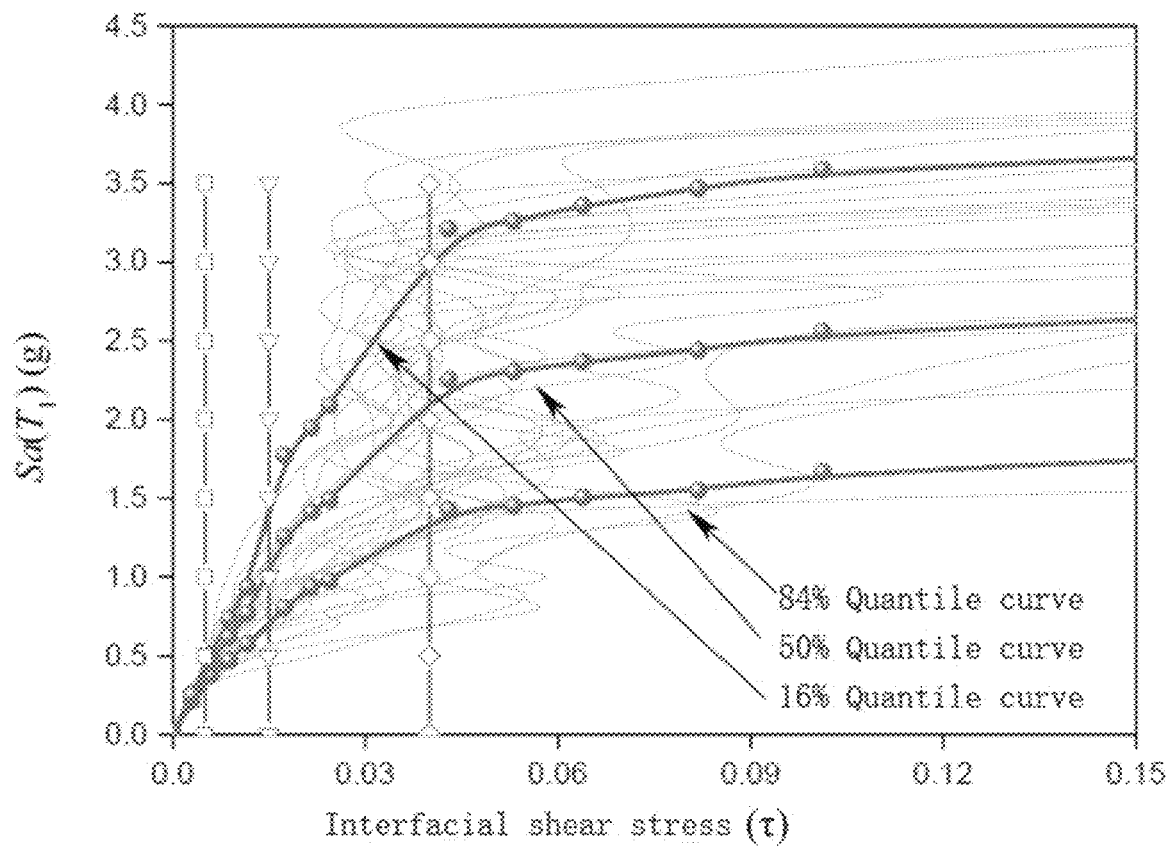
FIG. 4 illustrates a seismic vulnerability curve diagram of the external substructure reinforcement system obtained by the calculation method of the present disclosure.
Figure 5:
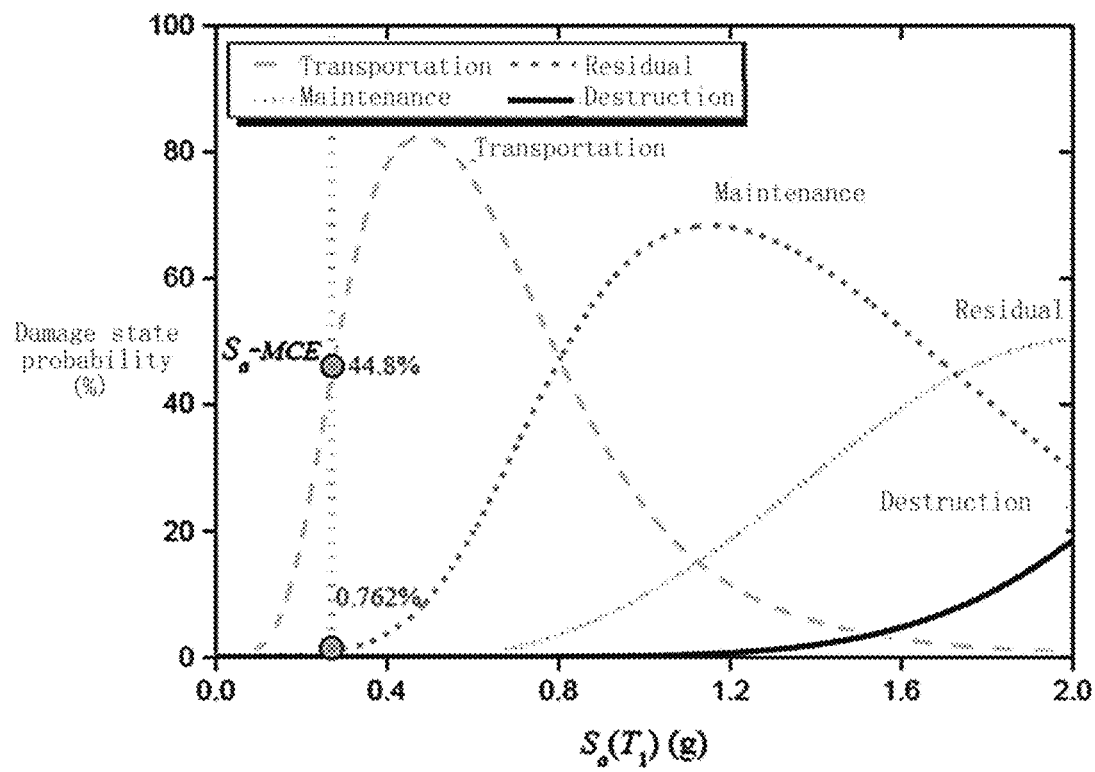
FIG. 5 illustrates a probabilistic seismic damage curve diagram of the external substructure reinforcement system under different limit states obtained by the calculation method of the present disclosure.
Figure 6A:
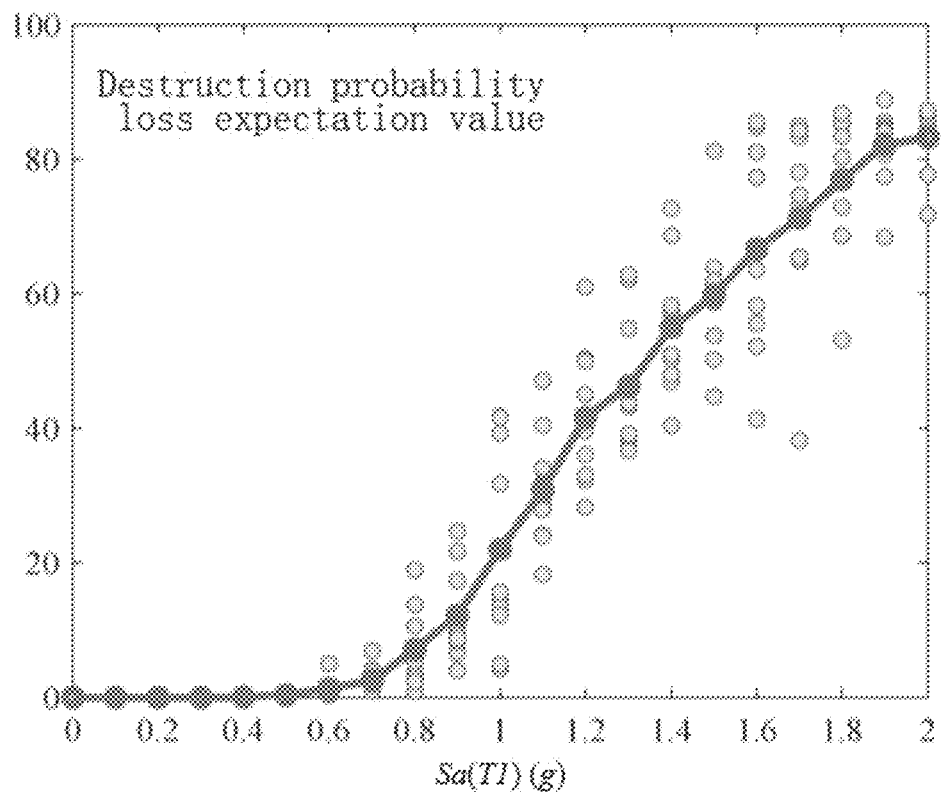
FIG. 6a illustrates a curve diagram of probabilistic loss expectation values of the external substructure reinforcement system under a destruction state.
Figure 6B:
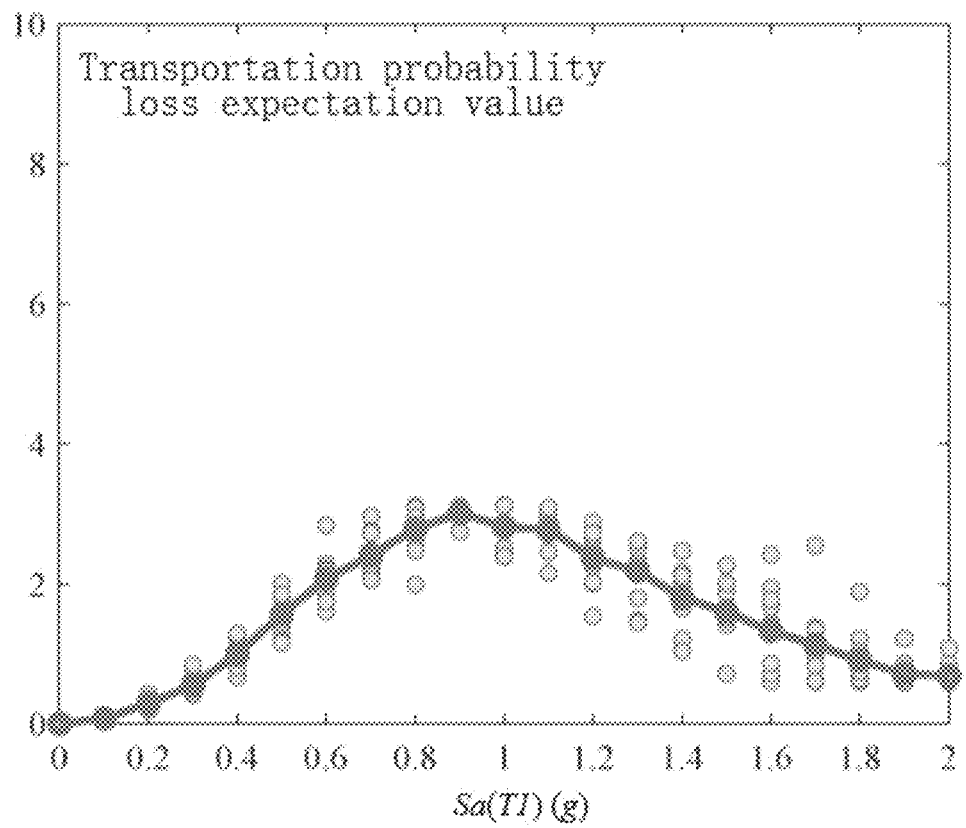
FIG. 6b illustrates a curve diagram of probabilistic loss expectation values of the external substructure reinforcement system under a transportation state.
Figure 6C:
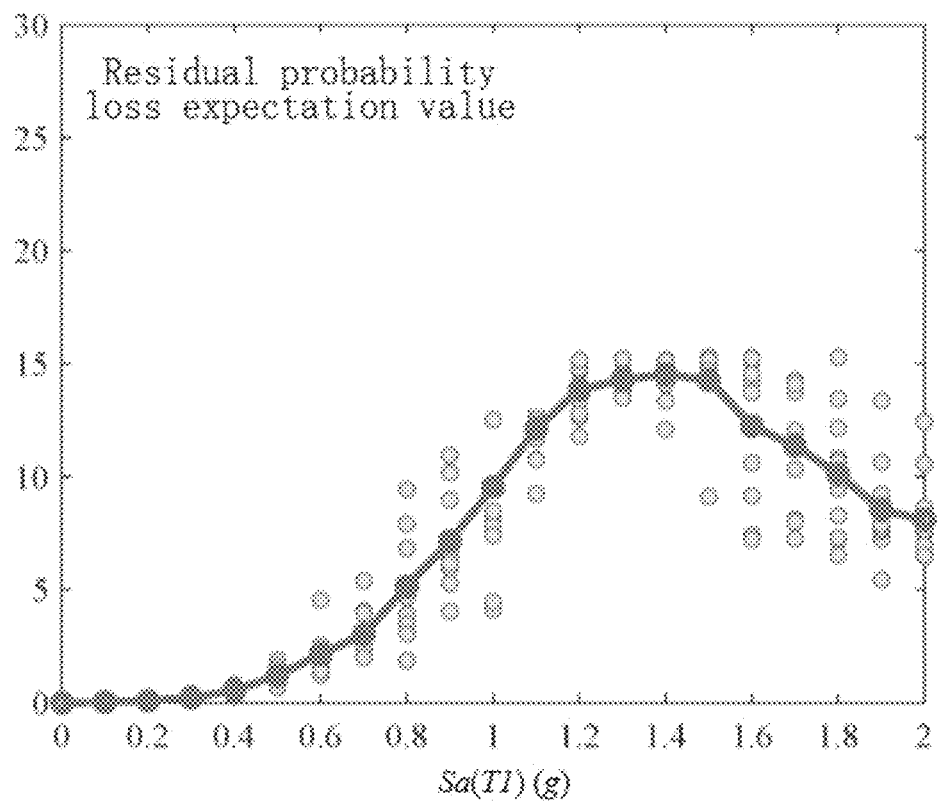
FIG. 6c illustrates a curve diagram of probabilistic loss expectation values of the external substructure reinforcement system under a residual state.
Figure 6D:
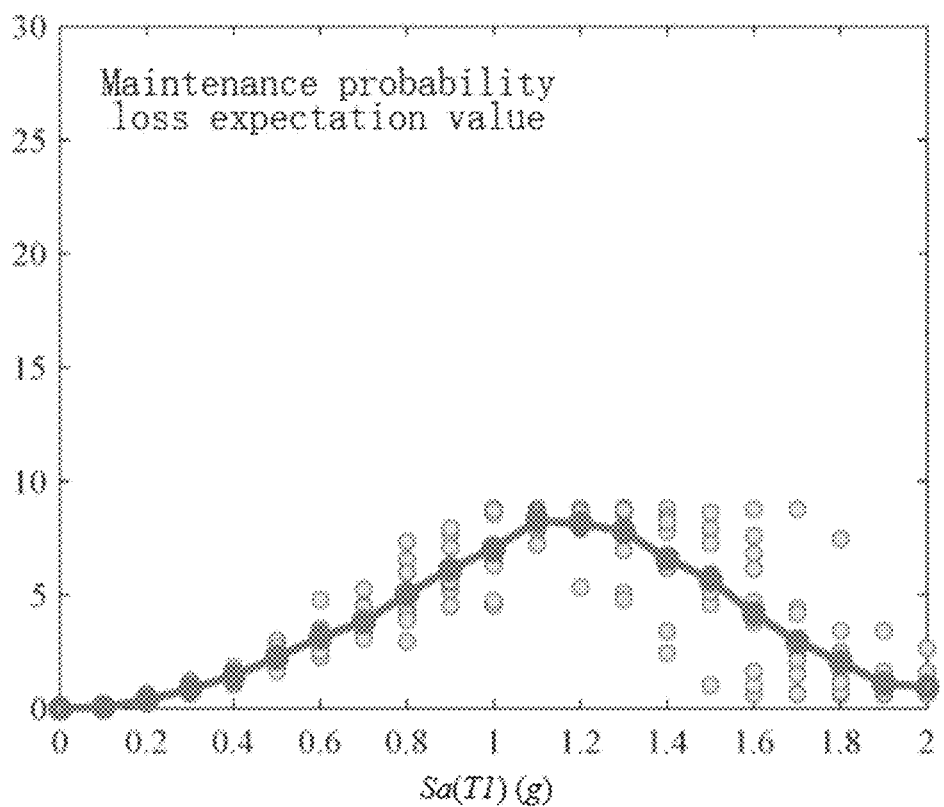
FIG. 6d illustrates a curve diagram of probabilistic loss expectation values of the external substructure reinforcement system under a maintenance state.

In order to further illustrate the calculation method of the present disclosure, an analysis is made based on a specific reinforcement project. An original structure for the reinforcement project is a five-storey office building with a plane size of 27 meters (m)×15.3 m, the five-storey office building is located on Class II site soil, the regional fortification intensity is 8 degrees, and a corresponding peak acceleration of a medium seism is 0.2 gravities (g). As shown in FIG. 2, the first, third, and fifth spans of a plane of the five-storey office building are reinforced with external substructures. The five-storey office building and the external substructures form an external substructure reinforcement system, and a seismic performance analysis of the external substructure reinforcement system is performed. In the seismic performance analysis, a first periodic spectral acceleration Sa($T_1$) is used as a seismic ground motion intensity parameter IM, and an engineering demand parameter (EDP) is the interfacial shear stress (τ). FIG. 3 illustrates a probabilistic seismic hazard curve diagram (i.e., the probabilistic hazard model $H_{IM}(x)$) of the external substructure reinforcement system obtained by the calculation method of the present disclosure. FIG. 4 illustrates a seismic vulnerability curve diagram (i.e., the probabilistic vulnerability model P(edp|im)) of the external substructure reinforcement system obtained by the calculation method of the present disclosure. FIG. 5 illustrates a probabilistic seismic damage curve diagram (i.e., the probabilistic damage model P(DS=$ds_i$|IM)) of the external substructure reinforcement system under different limit states obtained by the calculation method of the present disclosure. FIGS. 6a-6d illustrate curve diagrams of probabilistic loss expectation values of the external substructure reinforcement system under different limit states (the limit states include a destruction state, a transportation state, a residual state, and a maintenance state); correspondingly, the destruction loss coefficient α1 is 0.84, the transportation loss coefficient α2 is 0.5, the residual loss coefficient α3 is 0.16, and the maintenance loss coefficient α3 is 0.1; and the calculation method of the present disclosure performs 100 calculations on the probabilistic loss expectation values of the external substructure reinforcement system under each of the limit states based on the first periodic spectral acceleration Sa($T_1$).

Figure 7:
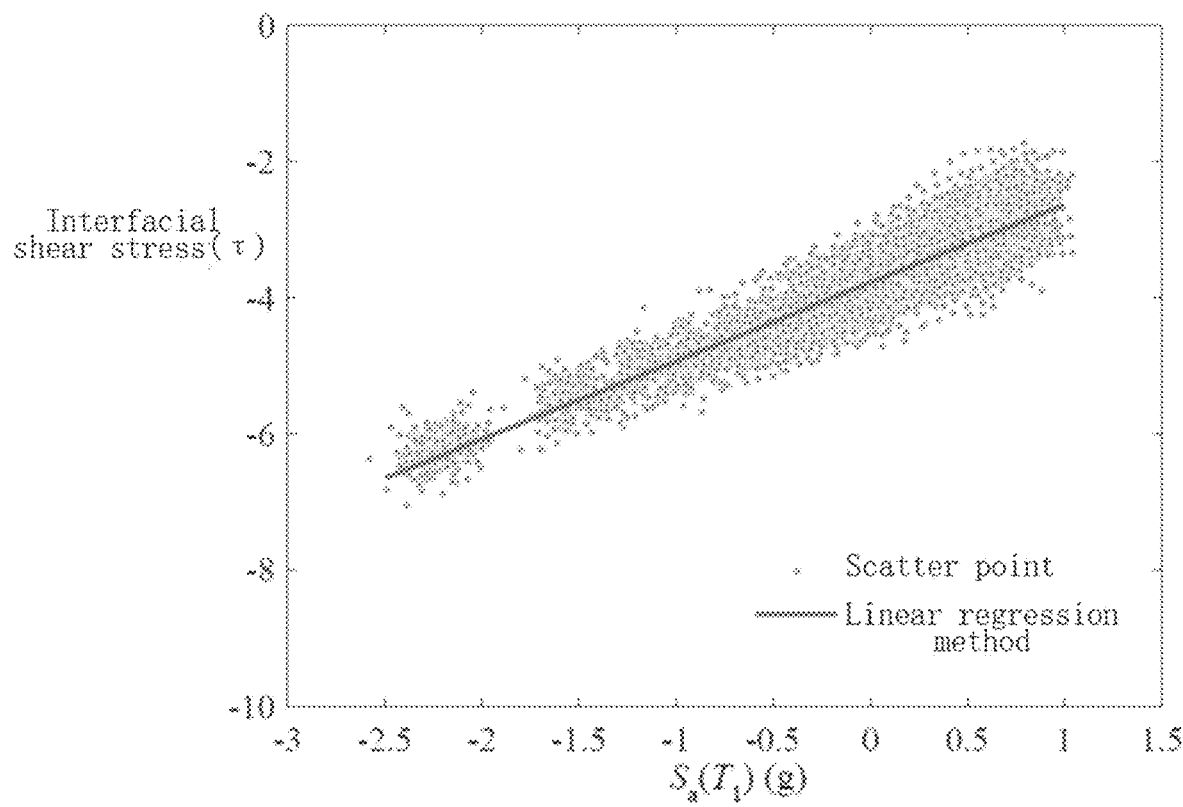
FIG. 7 illustrates an annual average probabilistic seismic loss of an external substructure reinforcement system based on interfacial shear stresses in the embodiment of the present disclosure.
Figure 8:
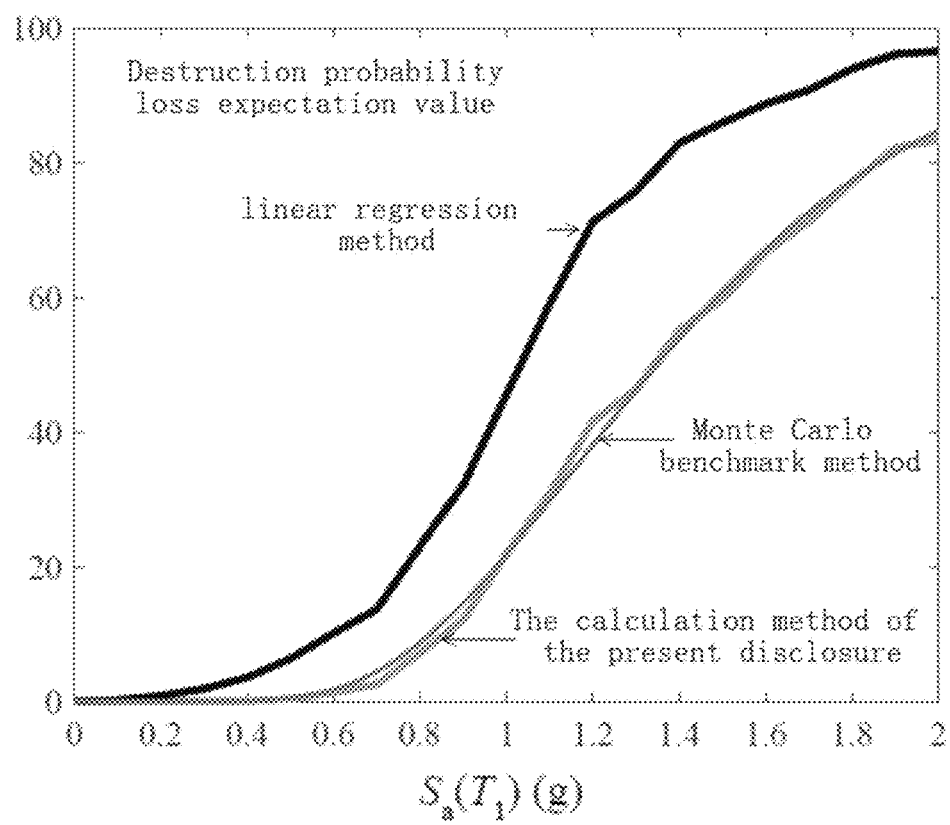
FIG. 8 illustrates a comparison diagram of calculation results of the calculation method of the present disclosure, the classical Monte Carlo benchmark method, and a traditional linear regression method.

To compare and verify the effectiveness and accuracy of the calculation method of the present disclosure, the embodiment takes a destruction state as an example, a calculation result of the classic Monte Carlo benchmark method as a standard reference (10000 calculations are performed for probabilistic loss expectation values of the external substructure reinforcement system under the destruction state based on Sa(T₁)), and a traditional linear regression method is selected for comparison (100 calculations are performed for probabilistic loss expectation values of the external substructure reinforcement system under the destruction state based on Sa(T₁)). FIG. 7 illustrates a curve diagram (i.e., a linear regression process) of annual average probabilistic seismic losses of the external substructure reinforcement system obtained by the traditional linear regression method. FIG. 8 illustrates a comparison diagram of calculation results of the calculation method of the present disclosure, the classical Monte Carlo benchmark method, and the traditional linear regression method. From FIG. 8, it can be seen that compared to traditional linear regression method, the calculation method of the present disclosure has a good fit with the classical Monte Carlo benchmark method. Therefore, the calculation method of the present disclosure is more accurate than the traditional linear regression method. The classical Monte Carlo benchmark method performs 10000 calculations while the calculation method of the present disclosure performs 100 calculations, which indicates that the calculation method of the present disclosure is more efficient when obtaining approximate results, greatly reducing the computational workload.

What is claimed is:

1. A calculation method for an annual average probabilistic seismic loss of an external substructure reinforcement system based on interfacial shear stresses, comprising:
   step 1: establishing a deterministic model for the external substructure reinforcement system, and generating seismic ground motion samples and structural samples by random sampling according to the deterministic model;
   step 2: establishing a probabilistic hazard model based on the seismic ground motion samples;
   step 3: generating a probabilistic vulnerability model based on the interfacial shear stresses; wherein the step 3 comprises:
      step 3.1: determining an amplitude modulation interval m of a seismic ground motion intensity parameter;
      step 3.2: performing nonlinear dynamic time history response analysis according to the amplitude modulation interval m, thereby obtaining seismic ground motion intensity parameters and the interfacial shear stresses under different seismic ground motion intensity levels;
      step 3.3: summarizing the interfacial shear stresses under the different seismic ground motion intensity levels, performing linear regression on the summarized interfacial shear stresses based on a logarithmic coordinate system and a least square method to obtain a regression coefficient $\beta_0$ and a regression coefficient $\beta_1$, and calculating a median value $S_{d|IM}$ and a logarithmic standard deviation $B_{d|IM}$ according to the regression coefficient $\beta_0$ and the regression coefficient $\beta_1$ by the following formulas:

$$\ln S_{d|IM} = \beta_0 + \beta_1 \cdot \ln IM$$

$$\beta_{d|IM} = \sqrt{\frac{\sum_{x=1}^{n}(\ln D_x - \ln S_{d|IM})^2}{n-2}}$$

where n represents the number of the seismic ground motion samples under the different seismic ground motion intensity levels, and $D_x$ represents interface shear stress data corresponding to an x-th analysis result of the nonlinear dynamic time history response analysis; and
      step 3.4: determining limit states and a limitation value d of the external substructure reinforcement system based on the interfacial shear stresses, and generating the probabilistic vulnerability model based on the interfacial shear stresses according to the median value $S_{d|IM}$, the logarithmic standard deviation $B_{d|IM}$, and the limitation value d;
   wherein the limit states comprise: a destruction state, a transportation state, a residual state, and a maintenance state;
   wherein after determining the limit states and the limitation value d of the external substructure reinforcement system based on the interfacial shear stresses, the calculation method further comprises:
      performing a subtraction operation on probabilistic vulnerability models of two adjacent limit states of the limit states, thereby obtaining a probabilistic seismic damage model P(DS=ds_i|IM) expressed as:

$$P(DS = ds_i \mid IM) = P_i(edp \mid im) - P_{i+1}(edp \mid im)$$

where $P_i$(edp|im) represents a probabilistic vulnerability model corresponding to an i-th limit state of the limit states, and $P_{i+1}$(edp|im) represents a probabilistic vulnerability model corresponding to an (i+1)-th limit state of the limit states;
   step 4: establishing a total probabilistic loss expectation model under the different seismic ground motion intensity levels according to the probabilistic vulnerability model;
   wherein the total probabilistic loss expectation model in the step 4 comprises probabilistic loss expectation values corresponding to the limit states; and the probabilistic loss expectation values are composed of a destruction probabilistic loss expectation value $L_C$, a transportation probabilistic loss expectation value $L_T$, a residual probabilistic loss expectation value $L_{NC \cap D}$, and a maintenance probabilistic loss expectation value $L_{NC \cap R}$;
   wherein a calculation formula of the destruction probabilistic loss expectation value $L_C$ under the seismic ground motion intensity parameter IM_x is expressed as:

$$L_C = E[L \mid C] \cdot P(C_p \mid IM) \cdot P(C_T \mid IM) \cdot \alpha 1$$

where E[Z|C] represents a theoretical destruction loss expectation value, E[Z|C] is equal to a replacement ratio coefficient corresponding to a destruction damage state of the external substructure reinforcement system, $P(C_P|IM)$ represents a probability corresponding to the external substructure reinforcement system being in the destruction damage state under the seismic ground motion intensity parameter IM_x; and $P(C_T|IM)$ represents a probability corresponding to the external substructure reinforcement system being in a transportation damage state under the seismic ground motion intensity parameter IM_x, and α1 represents a destruction loss coefficient;

wherein a calculation formula of the transportation probabilistic loss expectation value $L_T$ is expressed as:

$$L_T = E[L|T] \cdot P(C_P|IM) \cdot [1 - P(C_T|IM)] \cdot \alpha 2 \qquad 5$$

where E[Z|T] represents a theoretical transportation loss expectation value, E[Z|T] is equal to a replacement ratio coefficient corresponding to the transportation damage state of the external substructure reinforcement system, and α2 represents a transportation loss coefficient;

wherein a calculation formula of the residual probabilistic loss expectation value $L_{NC \cap D}$ is expresses expressed as:

$$L_{NC \cap D} = E[L|NC \cap D] \cdot P(C_D|NC, IM) \cdot \{1 - P(C_P|IM)\} \cdot \alpha 3$$

where E[L|NC∩D] represents a theoretical residual loss expectation value, and E[L|NC∩D] is equal to a replacement ratio coefficient corresponding to a residual damage state of the external substructure reinforcement system; P($C_D$|NC, IM) represents a probability corresponding to the external substructure reinforcement system being in the residual damage state under the seismic ground motion intensity parameter IM_x, and α3 represents a residual loss coefficient;

wherein a calculation formula of the maintenance probabilistic loss expectation value $L_{NC \cap R}$ is expressed as:

$$L_{NC \cap R} = E[L|NC \cap R, IM] \cdot \{1 - P(C_D|NC, IM)\} \cdot \{1 - P(C_P|IM)\} \cdot \alpha 4$$

where E[L|NC ∩R, IM] represents a theoretical maintenance loss expectation value, and E[L|NC ∩R, IM] is equal to a replacement ratio coefficient corresponding to a maintenance damage state of the external substructure reinforcement system under the seismic ground motion intensity parameter IM_x; and α4 represents a maintenance loss coefficient;

step 5: obtaining the annual average probabilistic seismic loss of the external substructure reinforcement system based on the interfacial shear stresses according to the total probabilistic loss expectation model and the probability probabilistic hazard model; and step 6: sending the annual average probabilistic seismic loss to management personnel, thereby making, by the management personnel, a seismic risk decision for a target structure corresponding to the external substructure reinforcement system and performing safety management on the target structure according to the annual average probabilistic seismic loss to thereby mitigating damage caused by earthquakes to the target structure.

2. The calculation method for the annual average probabilistic seismic loss of the external substructure reinforcement system based on the interfacial shear stresses as claimed in claim 1, wherein the probabilistic hazard model $H_{IM}(x)$ is expressed as:

$$H_{IM}(x) = P[IM \geq x] = k_0 \cdot x^{-k}$$

-continued $$k = \frac{\ln(p_{DBE}/p_{MCE})}{\ln(IM_{MCE}/IM_{DBE})}$$

$$k_0 = \exp\left[\frac{\ln(IM_{DBE}) \cdot \ln(p_{MCE}) - \ln(IM_{MCE}) \cdot \ln(p_{DBE})}{\ln(IM_{DBE}/IM_{MCE})}\right]$$

where $k_0$ and k represent shape parameters; IM represents the seismic ground motion intensity parameter, $IM_{DBE}$ represents a seismic ground motion intensity parameter of a design basis earthquake (DBE), and $IM_{MCE}$ represents a seismic ground motion intensity parameter of a maximum considered earthquake (MCE); a 50-year exceedance probability of the DBE is 10%, and a return period of the DBE is 475 years, and an annual exceedance probability $P_{DBE}$ of the DBE is 1/475; and a 50-year exceedance probability of the MCE is 2%, and a return period of the MCE is 2475 years, and an annual exceedance probability $P_{MCE}$ of the MCE is 1/2475.

3. The calculation method for the annual average probabilistic seismic loss of the external substructure reinforcement system based on the interfacial shear stresses as claimed in claim 1, wherein the step 3.2 further comprises:

setting an initial seismic ground motion intensity level x=1;

performing a loop: determining the seismic ground motion intensity parameter IM_x corresponding to the seismic ground motion intensity level x, randomly matching a structural sample $n_1$ of the structural samples and a seismic ground motion sample $n_2$ of the seismic ground motion samples under the seismic ground motion intensity level x, and performing the nonlinear dynamic time history response analysis to obtain a required interfacial shear stress r under the seismic ground motion intensity level x; and when a value of the seismic ground motion intensity level x is less than a value of the amplitude modulation interval m, increasing x by 1 and repeating the loop until the value of the seismic ground motion intensity level x is not less than the value of the amplitude modulation interval m; and performing the step 3.3 when the value of the seismic ground motion intensity level x is not less than the value of the amplitude modulation interval m.

4. The calculation method for the annual average probabilistic seismic loss of the external substructure reinforcement system based on the interfacial shear stresses as claimed in claim 1, wherein the probabilistic vulnerability model P(edp|im) is expressed as:

$$P(edp|im) = \Phi\left[\frac{\ln(S_{d|IM}/d)}{\beta_{d|IM}}\right] = \Phi\left[\frac{\beta_0 + \beta_1 \cdot \ln IM - \ln d}{\beta_{d|IM}}\right]$$

where Φ represents a standard normal distribution function.

5. The calculation method for the annual average probabilistic seismic loss of the external substructure reinforcement system based on the interfacial shear stresses as claimed in claim 1, wherein a calculation formula of the annual average probabilistic seismic loss of the external substructure reinforcement system based on the interfacial shear stresses according to the total probabilistic loss expectation model and the probabilistic hazard model is expressed as:

$$E[L] = \int_0^\infty E[L \mid IM] \cdot |dH_{IM}(x)|$$

where E[L] represents the annual average probabilistic seismic loss, E[L|IM] represents a total probabilistic loss expectation value, and $H_{IM}(x)$ represents the probabilistic hazard model.

6. The calculation method for the annual average probabilistic seismic loss of the external substructure reinforcement system based on the interfacial shear stresses as claimed in claim 1, further comprising: before the step 1, disposing the external substructure reinforcement system onto an outer surface of the target structure, for transferring damages caused by the earthquakes of the target structure to the external substructure reinforcement system.

7. A calculation method for an annual average probabilistic seismic loss of an external substructure reinforcement system based on interfacial shear stresses, wherein the calculation method is implemented by a calculation device comprising a processor and a memory with a calculation application stored therein; the calculation application, when executed by the processor, is configured to implement the calculation method; and the calculation method comprises:

step 1: establishing a deterministic model for the external substructure reinforcement system, and generating seismic ground motion samples and structural samples by random sampling according to the deterministic model;

step 2: establishing a probabilistic hazard model based on the seismic ground motion samples;

step 3: generating a probabilistic vulnerability model based on the interfacial shear stresses; wherein the step 3 comprises:

step 3.1: determining an amplitude modulation interval m of a seismic ground motion intensity parameter;

step 3.2: performing nonlinear dynamic time history response analysis according to the amplitude modulation interval m, thereby obtaining seismic ground motion intensity parameters and the interfacial shear stresses under different seismic ground motion intensity levels;

step 3.3: summarizing the interfacial shear stresses under the different seismic ground motion intensity levels, performing linear regression on the summarized interfacial shear stresses based on a logarithmic coordinate system and a least square method to obtain a regression coefficient $\beta_0$ and a regression coefficient $\beta_1$, and calculating a median value $S_{d|IM}$ and a logarithmic standard deviation Bam according to the regression coefficient $\beta_0$ and the regression coefficient $\beta_1$ by the following formulas:

$$\ln S_{d|IM} = \beta_0 + \beta_1 \cdot \ln IM$$

$$\beta_{d|IM} = \sqrt{\frac{\sum_{x=1}^{n}(\ln D_x - \ln S_{d|IM})^2}{n-2}}$$

where n represents the number of the seismic ground motion samples under the different seismic ground motion intensity levels, and $D_x$ represents interface shear stress data corresponding to an x-th analysis result of the nonlinear dynamic time history response analysis; and step 3.4: determining limit states and a limitation value d of the external substructure reinforcement system based on the interfacial shear stresses, and generating the probabilistic vulnerability model based on the interfacial shear stresses according to the median value Sam, the logarithmic standard deviation Bam, and the limitation value d;

wherein the limit states comprise: a destruction state, a transportation state, a residual state, and a maintenance state;

wherein after determining the limit states and the limitation value d of the external substructure reinforcement system based on the interfacial shear stresses, the calculation method further comprises:

performing a subtraction operation on probabilistic vulnerability models of two adjacent limit states of the limit states, thereby obtaining a probabilistic seismic damage model $P(DS=ds_i|IM)$ expressed as:

$P(DS=ds_i|IM)=P_i(\text{edp|im})-P_{i+1}(\text{edp|im})$ where $P_i(\text{edp|im})$ represents a probabilistic vulnerability model corresponding to an i-th limit state of the limit states, and $P_{i+1}(\text{edp|im})$ represents a probabilistic vulnerability model corresponding to an (i+1)-th limit state of the limit states;

step 4: establishing a total probabilistic loss expectation model under the different seismic ground motion intensity levels according to the probabilistic vulnerability model;

wherein the total probabilistic loss expectation model in the step 4 comprises probabilistic loss expectation values corresponding to the limit states; and the probabilistic loss expectation values are composed of a destruction probabilistic loss expectation value $L_C$, a transportation probabilistic loss expectation value $L_T$, a residual probabilistic loss expectation value $L_{NC \cap D}$, and a maintenance probabilistic loss expectation value $L_{NC \cap R}$;

wherein a calculation formula of the destruction probabilistic loss expectation value $L_C$ under the seismic ground motion intensity parameter IM_x is expressed as:

$L_C=E[L|C] \cdot P(C_P|(IM) \cdot P(C_T|IM) \cdot \alpha 1$ where E[Z|C] represents a theoretical destruction loss expectation value, E[Z|C] is equal to a replacement ratio coefficient corresponding to a destruction damage state of the external substructure reinforcement system, $P(C_P|IM)$ represents a probability corresponding to the external substructure reinforcement system being in the destruction damage state under the seismic ground motion intensity parameter IM_x; and $P(C_T|IM)$ represents a probability corresponding to the external substructure reinforcement system being in a transportation damage state under the seismic ground motion intensity parameter IM_x, and $\alpha 1$ represents a destruction loss coefficient;

wherein a calculation formula of the transportation probabilistic loss expectation value $L_T$ is expressed as:

$L_T=E[L|T] \cdot P(C_P|IM) \cdot [1-P(C_T|IM)] \cdot \alpha 2$ where E[Z|T] represents a theoretical transportation loss expectation value, E[Z|T] is equal to a replacement ratio coefficient corresponding to the transportation damage state of the external substructure reinforcement system, and $\alpha 2$ represents a transportation loss coefficient;

wherein a calculation formula of the residual probabilistic loss expectation value $L_{NC \cap D}$ is expressed as:

$$L_{NC \cap D} = E[L|NC \cap D] \cdot P(C_D|NC,IM) \cdot \{1-P(C_P|IM)\} \cdot \alpha 3$$

where $E[L|NC \cap D]$ represents a theoretical residual loss expectation value, and $E[L|NC \cap D]$ is equal to a replacement ratio coefficient corresponding to a residual damage state of the external substructure reinforcement system; $P(C_D|NC, IM)$ represents a probability corresponding to the external substructure reinforcement system being in the residual damage state under the seismic ground motion intensity parameter IM_x, and $\alpha 3$ represents a residual loss coefficient;

wherein a calculation formula of the maintenance probabilistic loss expectation value $L_{NC \cap R}$ is expressed as:

$$L_{NC \cap D} = E[L|NC \cap D] \cdot \{1-P(C_D|NC,IM)\} \cdot \{1-P(C_P|IM)\} \cdot \alpha 4$$

where $E[L|NC \cap R, IM]$ represents a theoretical maintenance loss expectation value, and $E[L|NC \cap R, IM]$ is equal to a replacement ratio coefficient corresponding to a maintenance damage state of the external substructure reinforcement system under the seismic ground motion intensity parameter IM_x; and $\alpha 4$ represents a maintenance loss coefficient;

step 5: obtaining the annual average probabilistic seismic loss of the external substructure reinforcement system based on the interfacial shear stresses according to the total probabilistic loss expectation model and the probability probabilistic hazard model; and step 6: sending, over the Internet, the annual average probabilistic seismic loss to a mobile terminal of management personnel, thereby receiving, by the mobile terminal, the annual average probabilistic seismic loss, and displaying the annual average probabilistic seismic loss on the mobile terminal to thereby assist the management personnel to make a seismic risk decision for a target structure disposed onto the external substructure reinforcement system and perform safety management on the target structure according to the annual average probabilistic seismic loss.

* * * * *